Aug. 27, 1968  E. A. MAGID  3,399,101
VALLEY PRINTING EFFECTS AND METHOD OF PRODUCING SAME
Filed Aug. 11, 1964
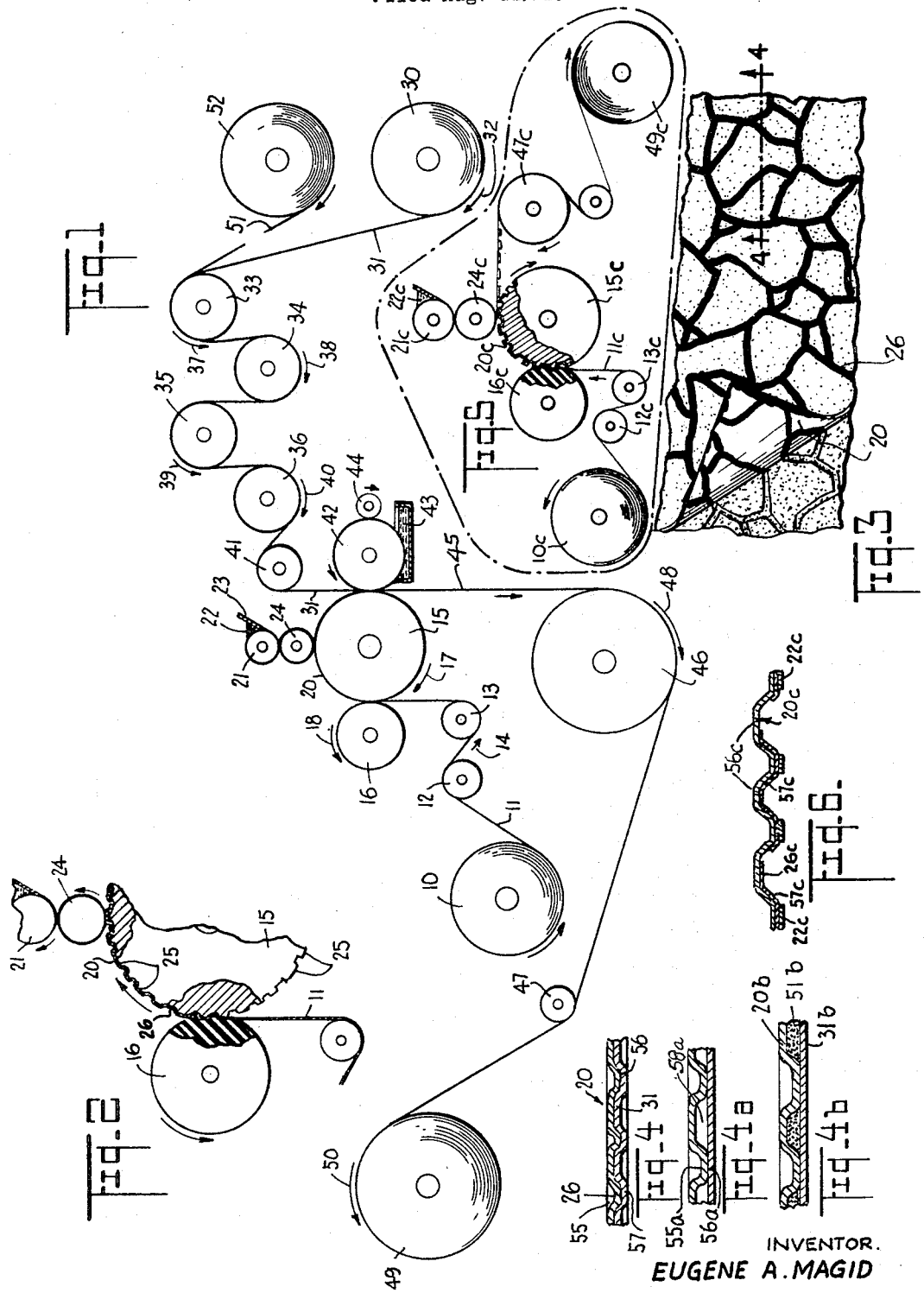
INVENTOR.
EUGENE A. MAGID
Percy Freeman
ATTORNEY

United States Patent Office

3,399,101
Patented Aug. 27, 1968

3,399,101
VALLEY PRINTING EFFECTS AND METHOD
OF PRODUCING SAME
Eugene A. Magid, 1610 Gloverly Lane,
Rydal, Pa. 19046
Filed Aug. 11, 1964, Ser. No. 388,776
7 Claims. (Cl. 161—5)

ABSTRACT OF THE DISCLOSURE

This invention relates generally to improvements in ornamental sheeting, and embraces unique methods of manufacturing the same. It relates to an embossed ornamental sheeting which simulates valley printing, said sheeting comprising a multi-ply web of material, at least the outer ply of which is light permeable, said outer ply bearing on its underside a printed decoration which confronts a backing sheet to which it is bonded, said printed decoration being visible through the light permeable sheet in conforming relation with the valleys of the embossed composite sheet.

---

While the present invention has been primarily developed for use in obtaining valley printing effects and advantageous results over conventional valley printing, and will be illustrated and described hereinafter with particular reference thereto, it is appreciated that the novel features of the instant invention are capable of many additional advantageous applications, all of which are intended to be comprehended herein.

Background of the invention

Heretofore, in conventional valley printing, an engraved embossing roller was employed to simultaneously depress and print the normally exposed surface of a plastic sheet. This procedure was subject to many limitations, including those of limited aesthetic effect and durability.

Accordingly, it is an important object of the present invention to provide a unique construction of plastic sheeting and method of manufacture wherein may be achieved the appearance of valley printing, with an additional three-dimensional or depth effect, and wherein the printed effect is immune from wear by abrasion and the like, being totally protected therefrom.

It is a more particular object of the present invention to provide a unique plastic-sheet construction including a transparent or light-permeable sheet having its exposed surface depressed to form embossing on its concealed surface, and wherein the embossing on its concealed surface is printed or decorated and visible through the sheet to afford the appearance of uniquely attractive valley printing while effectively protecting the decorative coating from damage or removal.

The instant invention contemplates the provision of various plastic-sheeting constructions having an ornamentally depressed, normally exposed surface and wherein a backing layer is secured to the normally concealed surface, the backing layer and depressed sheet serving to sandwich therebetween one or more intermediate layers of decorative coating, cushioning, reinforcing, or other desired material.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIGURE 1 is a diagrammatic representation of plastic-sheet-treating apparatus illustrative of the method of the instant invention.

FIGURE 2 is an enlarged fragmentary elevational view of the apparatus of FIGURE 1, partly in section for clarity.

FIGURE 3 is a fragmentary plan view showing sheeting construction in accordance with the teachings of the present invention, an upper or facing layer being partially turned back to expose an under or backing layer.

FIGURE 4 is a partial sectional elevational view taken generally along the line 4—4 of FIGURE 3.

FIGURE 4a is a sectional view similar to FIGURE 4, showing a slightly modified embodiment thereof.

FIGURE 4b is a sectional view similar to FIGURES 4 and 4a, showing a further slightly modified embodiment of the instant invention.

FIGURE 5 is a diagrammatic representation of apparatus illustrating practice of a slightly modified embodiment of the instant method.

FIGURE 6 is a fragmentary sectional view similar to FIGURE 4 and illustrating plastic sheeting as produced by the apparatus of FIGURE 5.

Referring now more particularly to the drawings, and specifically to FIGURES 1–4 thereof, the apparatus of FIGURE 1 includes a rotatable supply roll or coil 10 supplying a web of light-permeable thermoplastic sheet material 11. The sheet material 11 may be transparent, translucent, or of other desired light permeability, and may pass over heating rollers 12 and 13 in the direction of arrow 14. The sheet material 11 passes thence between the nip of tangential rollers 15 and 16, the former being a relatively hard, engraved roller, such as of steel or other suitable material, and the latter being a relatively soft impression or back-up roller, say of rubber or other suitably resiliently yieldable material. The rollers 15 and 16 rotate in the direction of arrows 17 and 18, respectively, the web or sheeting 11 passing between the tangential rollers and there being pressure-formed to assume the configuration of engraved roller 15, as at 20, best seen in FIGURE 2. For this purpose, the web or sheet 11 may advantageously be preheated, say by rollers 12 and 13, or other suitable heating means, as desired.

The formed sheet or web 20 passes thence about the engraved roller 15, some 90 degrees thereabout in the illustrated embodiment. Along this path there is provided a coating station including an inking roll 21 having associated therewith an ink fountain 22 and doctor blade 23. The inking roll is in tangential engagement with a transfer roll 24 to transfer ink to the latter, and the transfer roll 24 is in tangential engagement with the outer surface of formed web or sheet 20 on the engraved roller 15 to apply a coating of decorative material, ink, adhesive, combination thereof, or other desired material, to the sheet.

As best seen in FIGURE 2, the heated thermoplastic web or sheet 11 is depressed into the impression roller 16 by the raised portions or lands 25 of engraved roller 15 to form in the sheet 20 depressions 26, as viewed from the radially inner side of the sheet. These depressed portions 26 are, of course, of the ornamental configuration of the engraved roller 15 and may be considered as embossing on the radially outer surface of the sheet 20. It is the embossed surface portions which are coated or imprinted by roller 24.

At the right in FIGURE 1 is a supply roll 30 supplying a web of backing-sheet material 31, as by rotation in the direction of arrow 32. The backing sheet or web 31 may be trained about a series of heating rollers 33, 34, 35 and 36, for movement in the direction of arrows 37, 38, 39 and 40, and thence pass over heating roller 41 into the nip between engraved roller 15 and an additional impression roller 42. The impression roller 42 may be of suitable hardness for its intended purpose, as will appear more fully hereinafter, and have associated therewith a lubricating liquid 43 and a squeegee or liquid-removal roller 44.

The pressure-formed sheet or web 20 and backing sheet 31 are fed together into facing relation between the tangentially rotating engraving roller 15 and impression roller 42, there being laminated together and passing therefrom as a laminate web construction 45. The web 45 may pass about cooling roller 46 and idler 47, in the direction of arrow 48, and thence be wound upon a take-up roll 49 in the direction of arrow 50.

In addition, if desired, an intermediate sheet or layer 51, from a supply roll 52, may pass together with the backing sheet or layer 31 for lamination with the sheet 20, the layer 51 being sandwiched in interposed relation between the sheets 20 and 31.

If desired, the backing sheet or layer 31 may be pre-printed or decorated in any suitable manner, and may be of thermoplastic or other suitable material for securement by heat and pressure to the formed web 20; or it may be of suitable material which is merely adhesively secured to the latter web. For such securement, the rolls 21 and 24 may be employed to coat the embossing of web 20 with a suitable transparent or colored adhesive instead of the ink, and in both the latter cases the roller 42 would be harder than the roller 16, to serve as a back-up roller to provide any additional pressure required to bond the plies of the web together, and also to restrain the backing layer 31 from being impressed into conforming relation with the formed sheet 20.

The intermediate or filler layer 51 may be of any suitable sheet material, such as netting, fabric, foam, lace, or other, and may be used for strength, insulation, decoration, or the like, as desired.

Further, the impression roller 42 may be of relatively yieldable material, such as medium-durometer rubber, similar to that of impression roll 16, whereupon the backing layer 31 will be impressed into conforming relation with the formed sheet 20.

This condition is shown in FIGURES 3 and 4, the formed sheet 20 having thermoformed depressions 26 providing on the outer or normally exposed surface depressed portions 55 and, on the inner or normally concealed surface embossed portions 56. The embossed portions are coated with suitable decorative material, such as ink, or adhesive, or other, as at 57. The backing sheet or web 31 has been formed, at the nip of rollers 15 and 42, into conforming relation with the sheet 20, and secured thereto, as by heat and pressure, adhesive, or the like.

In the embodiment of FIGURE 4a, a formed sheet includes depressed formations having outer depressed surface portions 55a on the outer or exposed surface of said sheet and surface portions 56a on the inner or concealed side of said sheet. A coating material may be applied to the portions 56a of the normally concealed surface, and a backing layer secured to the normally concealed side of said sheet. The backing layer may be substantially flat, or without depressions, extending between and secured to the depressions and spaced from the remainder of said sheet. This provides intersheet spaces 58a which may be occupied by atmospheric air to afford a quilted or cushioning effect.

The embodiment of FIGURE 4b is similar to that of FIGURE 4a, except that an intermediate layer or sheet 51b is sandwiched between the formed sheet 20b and backing sheet 31b, the sandwich layer 51b being illustrated as of foam and expanded to fully occupy the space between the sheets 20b and 31b.

The apparatus of FIGURE 5 is similar to that of FIGURE 1. A supply roll of light-permeable thermoplastic sheet material which is pre-printed on one face, is generally designated 10c. The web 11c extends therefrom between the nip of engraved roller 15c and a relatively soft impression roller 16c. Proceeding from the nip of rollers 15c and 16c is a formed sheet or web 20c which moves on a roller 15c past a printing or coating station including a transfer roll 24c, feed roll 21c and ink-supply fountain 22c. Thus, decorative material, such as ink or the like, is applied to the embossed or raised surfaces of web 20c, whereupon the decorated web passes by cooling drum 47c for coiling about a take-up roll 49c.

The product of FIGURE 5 is shown in FIGURE 6, the formed sheet there being designated 20c and having its normally exposed surface formed with depressed portions 26c defining on the normally concealed surface corresponding embossed surface portions 56c having a coating 57c of the coating material 22c.

From the foregoing, it is seen that the present invention provides a construction of multi-ply sheeting, and method of manufacturing the same, which fully accomplish their intended objects and are well adapted to meet practical conditions of manufacture and use.

It should be understood that "sheeting" is used in its broadest sense and is intended to include any and all flexible webs of all kinds, quality and gage of material.

Although the present invention has been described in some detail by way of illustration and example for purposes of clarity of understanding, it is understood that certain changes and modifications may be made within the spirit of the invention and scope of the appended claims.

What is claimed is:

1. In the method of making multi-ply valley printed sheeting, the steps which comprise: depressing by an engraved pattern embossing roller and a back-up roller, portions of the normally exposed side of a light-permeable preheated thermoplastic protective sheet in an ornamental pattern to emboss corresponding portions of its normally concealed side, and while still on said pattern embossing roller, applying a coating of ornamental material to the embossed portions of the normally concealed side, said coating being visible through said sheet from the normally exposed side thereof and while said sheet is still on said pattern embossing roller, bonding an intermediate layer of cellular material sheeting and a backing layer to the normally concealed side of said sheet in conforming relation thereto by simultaneously passing said sheet and the layers together through the nip of said pattern embossing roller and a second back-up embossing roller to provide an attractive and valley printed effect on said composite sheeting when separated from said pattern embossing roller, and whereby all space between the light-permeable sheet and the backing layer is occupied by the cellular material.

2. The method set forth in claim 1, wherein the cellular material sheeting is expanded vinyl.

3. In the method of making protected multi-ply valley printed sheeting, the steps which comprise, drawing from a supply-roll a thermoplastic light-permeable sheet, heating said sheet to soften the material thereof, passing said heated sheet through the nip of an engraved pattern embossing roller and a first embossing back-up roller, thence while retaining said sheet on said engraved pattern embossing roller, imprinting a decoration upon the peak surface of said embossed sheet in precise registration with the embossment design; drawing from other supply sources at least one backing layer, heating said backing layer, bringing said backing layer to said embossed and imprinted sheet while the latter is still on said engraved pattern embossing roller, passing both the sheet and the backing layer together in the nip of said engraved pattern embossing roller and a second back-up embossing roller thereby to carry the identical embossment through both the sheet and the backing layer and simltaneously laminating them together, with the imprinted decoration in precise registration over the entire embossment design of the composite web and with said imprinted decoration visible through and protected by the light-permeable sheet, whereby said composite web, upon being removed from the pattern embossing roller, defines said previously decorated peak areas as the valley printed areas of the finished product.

4. As an article of manufacture, an embossed ornamental sheeting which simulates valley printing, said sheeting comprising at least three plies of web material, at least the outer ply of which is light-permeable, said light-permeable sheet bearing a printed decoration on its normally concealed side which confronts the backing sheet to which it is bonded forming pockets filled with the intermediate web material wherein said printed decoration is in precise conforming relation with the valleys of the embossed composite sheet and being visible through and protected by the light-permeable sheet.

5. The article as set forth in claim 4 wherein one of the plies of said composite sheet, other than the outer ply, is of fibrous material, said fibrous material occupying all spaces between the light-permeable sheet and the backing layer.

6. The article set forth in claim 4 wherein one of the plies of said composite sheet, other than the outer ply, is of cellular material, said cellular material occupying all spaces between the light-permeable sheet and the backing layer.

7. The article set forth in claim 6 wherein said ply of cellular material is expanded vinyl.

References Cited
UNITED STATES PATENTS

| | | | |
|---|---|---|---|
| 1,985,480 | 12/1934 | Carpenter | 161—6 |
| 2,596,377 | 5/1952 | Derman | 117—11 |
| 2,733,180 | 1/1956 | Pinto | 156—209 |
| 2,855,844 | 10/1958 | Stewart | 101—23 |
| 3,024,154 | 3/1962 | Singleton et al. | 156—209 |
| 3,026,231 | 3/1962 | Chavannes | 156—205 |
| 3,036,945 | 5/1962 | Souza | 206—59 |
| 3,256,131 | 6/1966 | Koch et al. | 161—119 |

ROBERT F. BURNETT, *Primary Examiner.*

W. A. POWELL, *Assistant Examiner.*